Feb. 12, 1957  F. B. W. HYNES  2,781,081
BUMPER SEAT
Filed Feb. 8, 1954
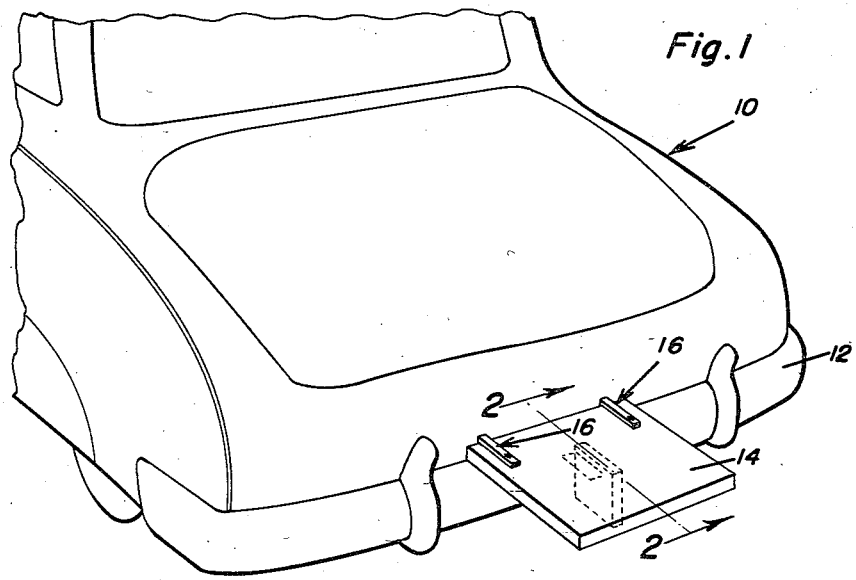
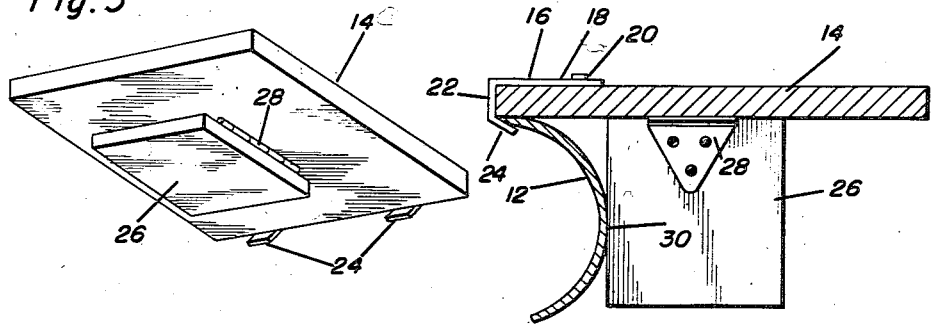
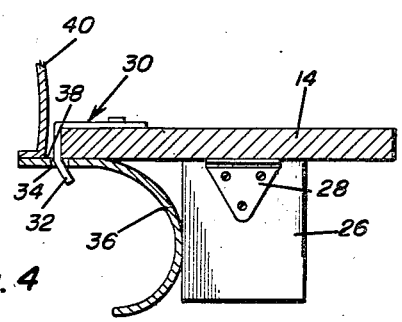
Fred. B. W. Hynes
INVENTOR.

United States Patent Office 2,781,081
Patented Feb. 12, 1957

2,781,081
BUMPER SEAT

Fred B. W. Hynes, Ottawa, Ill.

Application February 8, 1954, Serial No. 408,869

1 Claim. (Cl. 155—78)

This invention relates generally to seat structures, and pertains more particularly to a storable seat structure particularly adapted for use on vehicle bumpers.

A primary object of this invention is to provide a seat structure which may be easily stored in the trunk of an automobile or the like and which may be used, when assembled on the bumper, as a seat or a table. The invention is particularly useful for sportsmen who must change footwear after arrival at the scene of their activity or to those persons who must prepare their gear for use. It may also be utilized as a seat for observing sports activities and the like, and may equally well serve as a table for preparing a picnic.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the rear portion of an automobile with the bumper seat attached thereto;

Figure 2 is a vertical section taken substantially along the plane of section line 2—2 of Figure 1 showing details of construction on an enlarged scale;

Figure 3 is a perspective view of the seat assembly in folded position; and

Figure 4 is a view similar to Figure 2, but showing a modified form of construction.

Referring now more particularly to the drawings, reference numeral 10 indicates a vehicle, such as an automobile, and numeral 12 indicates the rear bumper thereof, although it is to be understood that the invention is equally well adaptable to the front bumper of a vehicle and may be utilized on any vehicle which incorporates a bumper structure.

The invention consists essentially of a seat board portion 14 of generally rectangular configuration which is provided at its rear edge with a pair of overhanging hook members 16 of generally J-shaped configuration whose stem portions 18 overlie a portion of the board and are secured thereto as by fasteners 20, and whose bight portions 22 overlie the end edge of the seat board 14 such that the free end portions 24 thereof extend angularly downwardly at an acute angle to the bottom of the seat board such as to hook onto the top edge of the bumper 12 in the manner indicated most clearly in Figure 2.

An abutment member 26 is pivotally secured to the undersurface of the seat board 14 by means of a hinge 28 and, when swung downwardly in the position as shown in Figure 2, abuts the rear face of the bumper 12, as at 29, so as to rigidly support the seat board thereon. When it is desired to store the seat assembly when not in use, the abutment member 26 is folded up against the undersurface of the seat board 14 in the manner shown in Figure 3, whereby a neat and compact assembly is presented.

Referring now more particularly to Figure 4 wherein a modified form of the invention is shown, this form of the invention will be seen to consist of the seat board 14 and abutment member 26 as previously described, but the hook members 30, although of J-shaped configuration generally as previously described members 16, are preferably of circular configuration in cross-section, at least in their angulated depending end portions 32 such that they may be received through apertures 34 provided in the vehicle bumper 36. This particular assembly is particularly adapted for use in those vehicles wherein the top portion 38 of the bumper underlies the rear deck portion 40 of the vehicle such that the use of hook members such as those shown at 16 is not possible. To make use of this modified form of the invention, it is merely necessary to drill the apertures 34 at properly spaced intervals on the top portion 38 of the bumper, whereby the seat assembly may be properly engaged therewith.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A seat attachment for vehicle bumpers comprising a seat member, said seat member having flat top and bottom surfaces and a straight edge portion, a pair of spaced hook members secured to said seat member, each hook member including a stem rigidly affixed to the top surface of said seat member and extending to said straight edge, a bight portion projecting downwardly at said straight edge, and a free end portion extending angularly downwardly under the straight edge to underlie said bottom surface of the seat member whereby a bumper member may be received and hooked between said free end and the bottom surface of the seat member, and an abutment member hinged to the bottom surface of the seat member for swinging downwardly against a bumper about an axis transverse to said straight edge.

References Cited in the file of this patent

UNITED STATES PATENTS

| | | |
|---|---|---|
| 941,544 | Skogsberg | Nov. 30, 1909 |
| 1,952,377 | Lack | Mar. 27, 1934 |
| 2,059,115 | Kay | Oct. 27, 1936 |
| 2,504,343 | Mitchell | Apr. 18, 1950 |
| 2,601,888 | Schopper | July 1, 1952 |